L. HAUBERT.
POWER DELIVERING ATTACHMENT FOR AUTOMOBILE TRACTORS.
APPLICATION FILED MAR. 24, 1920.

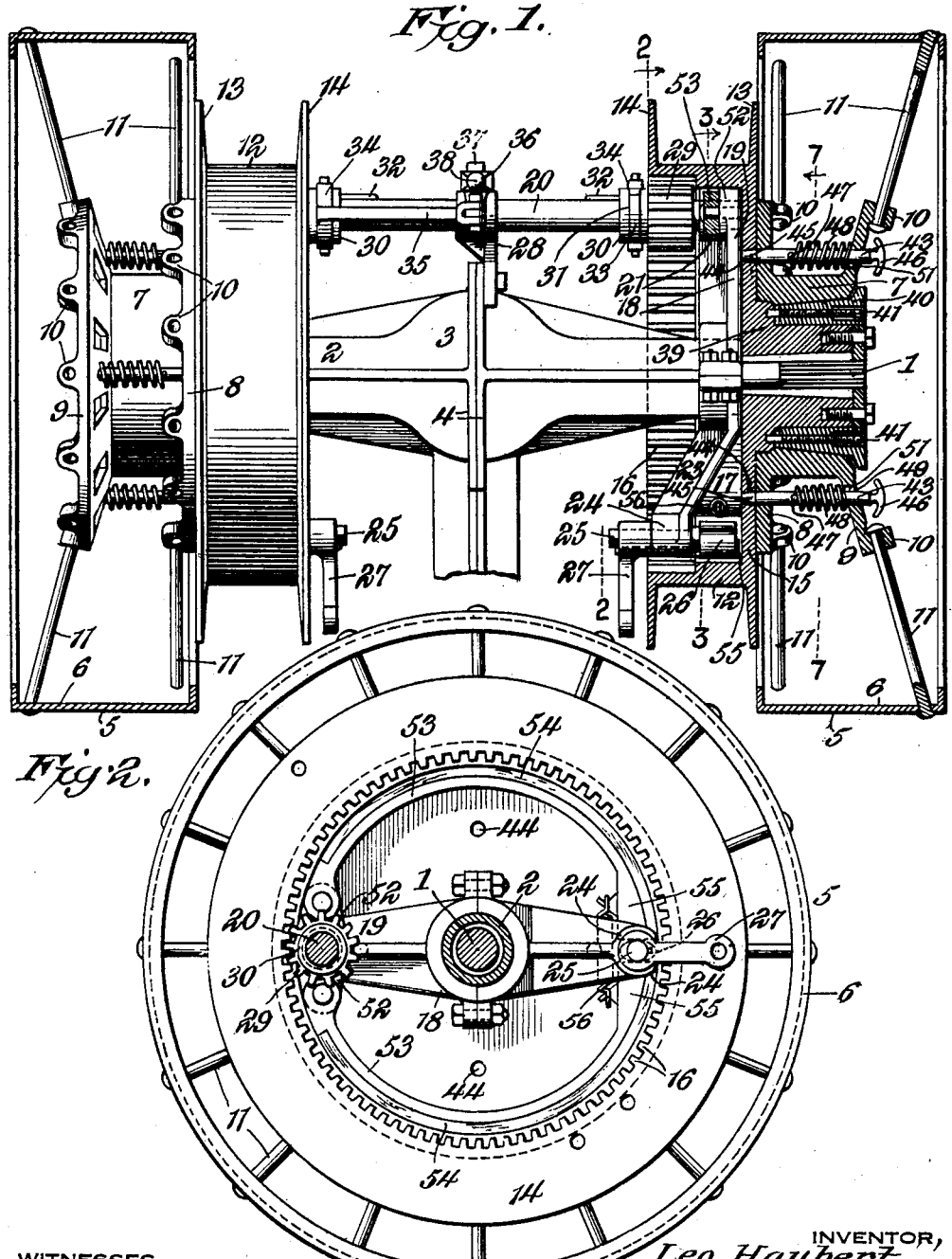

1,399,344.

Patented Dec. 6, 1921.
3 SHEETS—SHEET 2.

WITNESSES
Howard D. Orr.
A. T. Chapman.

Leo Haubert, INVENTOR,

BY E. G. Siggers
ATTORNEY

L. HAUBERT.
POWER DELIVERING ATTACHMENT FOR AUTOMOBILE TRACTORS.
APPLICATION FILED MAR. 24, 1920.
1,399,344.
Patented Dec. 6, 1921.
3 SHEETS—SHEET 3.
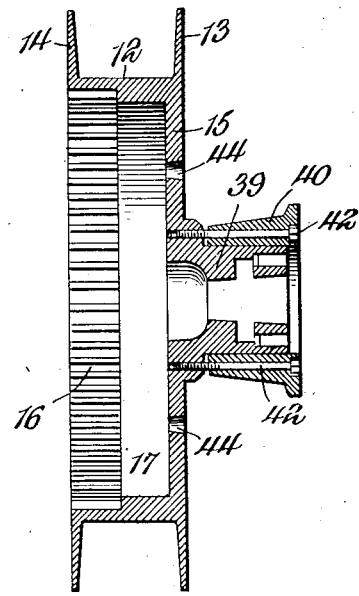
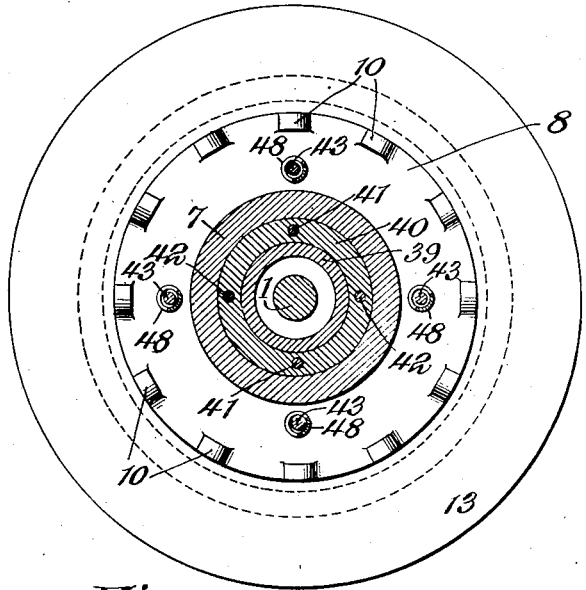
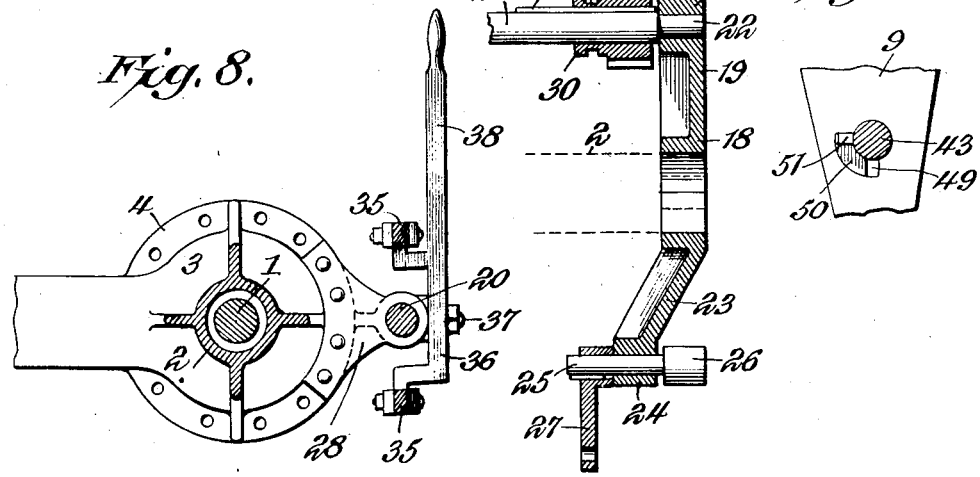
Leo Haubert, INVENTOR,
WITNESSES
BY
ATTORNEY

UNITED STATES PATENT OFFICE.

LEO HAUBERT, OF MUSKOGEE, OKLAHOMA, ASSIGNOR OF ONE-HALF TO JOHN A. WOLFE, OF TULSA, OKLAHOMA.

POWER-DELIVERING ATTACHMENT FOR AUTOMOBILE-TRACTORS.

1,399,344.  Specification of Letters Patent.  Patented Dec. 6, 1921.

Application filed March 24, 1920. Serial No. 368,251.

*To all whom it may concern:*

Be it known that I, LEO HAUBERT, a citizen of the United States, residing at Muskogee, in the county of Muskogee and State of Oklahoma, have invented a new and useful Power-Delivering Attachment for Automobile-Tractors, of which the following is a specification.

This invention has reference to power delivering attachments for automobile tractors, and its object is to provide means to be substituted for the ordinary rear or driving wheels of the tractor, whereby the power unit of the automobile may be used for various purposes while the vehicle is standing still.

In accordance with the invention there is provided a drum and a traction wheel for each end of the driving axle to replace the ordinary driving wheel, and the substitute structure is of a character permitting the vehicle to be used as an automobile tractor or as a hoisting or driving means for utilizing the power developed by the engine of the tractor with the driving of the tractor wheels cut out of service but still utilized as a support and anchorage for the vehicle.

The invention also comprises means whereby either or both sides of the power delivering attachment may be used without interference from the differential mechanism customarily provided with motor vehicles and tractors of various types.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a plan view, partially in cross section, of the rear end of a motor vehicle equipped with the invention, some parts being shown in horizontal section.

Fig. 2 is a section on the line 2—2 of Fig. 1.

Fig. 6 is a diametric section of one of the drums taken on a plane at right angles to the sectioned portion of Fig. 1.

Fig. 7 is a section on the line 7—7 of Fig. 1.

Fig. 8 is a section through the rear axle at one side of and showing the differential and also showing certain operating mechanism.

Fig. 9 is a longitudinal tection through an arm constituting a support for the brake and for one end of a connecting shaft for the winding drums.

Fig. 10 is a detail view of a locking means for connecting pins employed in the structure.

Figure 3:
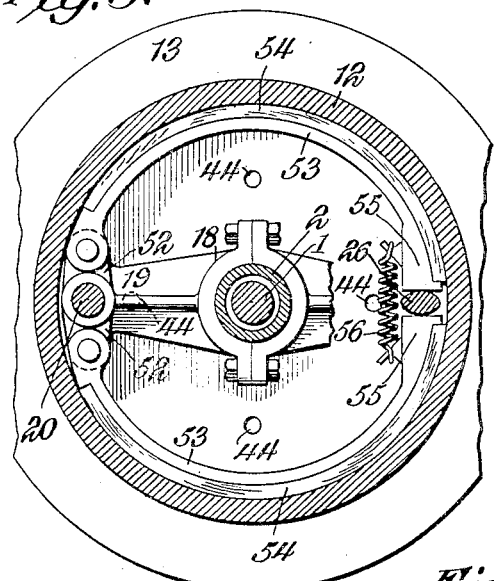
Fig. 3 is a section on the line 3—3 of Fig. 1.
Figure 4:
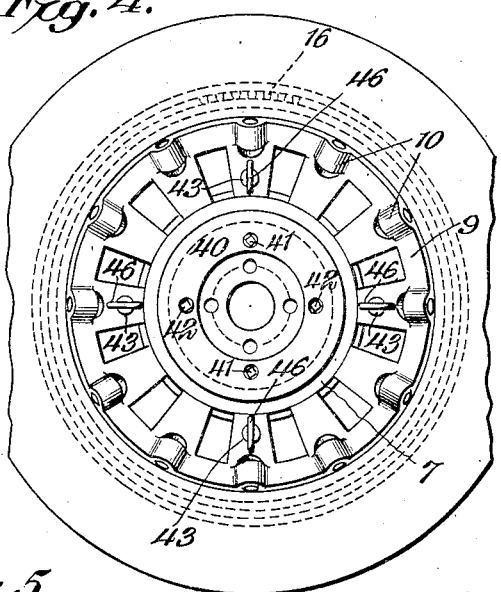
Fig. 4 is a face view of one of the traction wheels and the associated drum, some parts being omitted.

Referring to the drawings, there is shown a rear axle 1 and a rear axle housing 2 of a motor vehicle, either of the tractor, truck or passenger type and the housing includes a portion 3 which may be assumed as inclosing the usual differential gearing and including flanges 4 by means of which the axle housing is joined at the differential. The parts so far described may be considered as of usual construction, while the parts to be described are in most part different from those found in automobiles and constitute parts of the invention.

There are also provided traction wheels 5, one for each end of the power axle 1. These wheels each have a rim 6, a hub 7 with inner and outer flanges 8 and 9, respectively, these flanges being provided with series of ears 10 connected to the rim 6 by spokes 11 which may each be joined at one end to a respective ear 10 and at the other or outer end to the rim 6 by riveting or in other suitable manner.

Fast to the axle 1 near the outer ends thereof and adjacent to the inner face of each of the traction wheels 5 are drums 12 each with inner and outer flanges 13 and 14, respectively. Each drum is provided with one end plate or head 15 at the end having the flange 14, while the other end of the drum is open and for about one half the depth of the drum has a circular series of gear teeth 16 on its inner face. The inner face of the drum between the gear teeth 16 and the head 15 is smooth, as indicated at 17, to constitute a brake surface.

Mounted on the casing 2 within each drum 12 is an arm 18 shown separately in Fig. 9. The arm 18 is extended at one end, as shown at 19, and there receives and supports a shaft 20, being provided with a journal bearing 21 for the reduced extension 22 of the shaft. The arm 18 has an offset end 23 extended away from the casing 2 and also bent at an angle so as to offset from the head 15 toward the middle of the machine. At the extremity of the extension 23 there is provided an enlargement 24 constituting a bearing for a rock shaft 25 terminating at one end in a cam head 26 between the bearing 24 and the face plate 15. At the end of the rock shaft 25 remote from the head 26, the rock shaft carries a rock arm 27 fast thereto, to which rock arm may be secured the customary brake reach rod, which rod however is not shown in the drawings since its construction and function is too well known to need either illustration or description.

Figure 5:
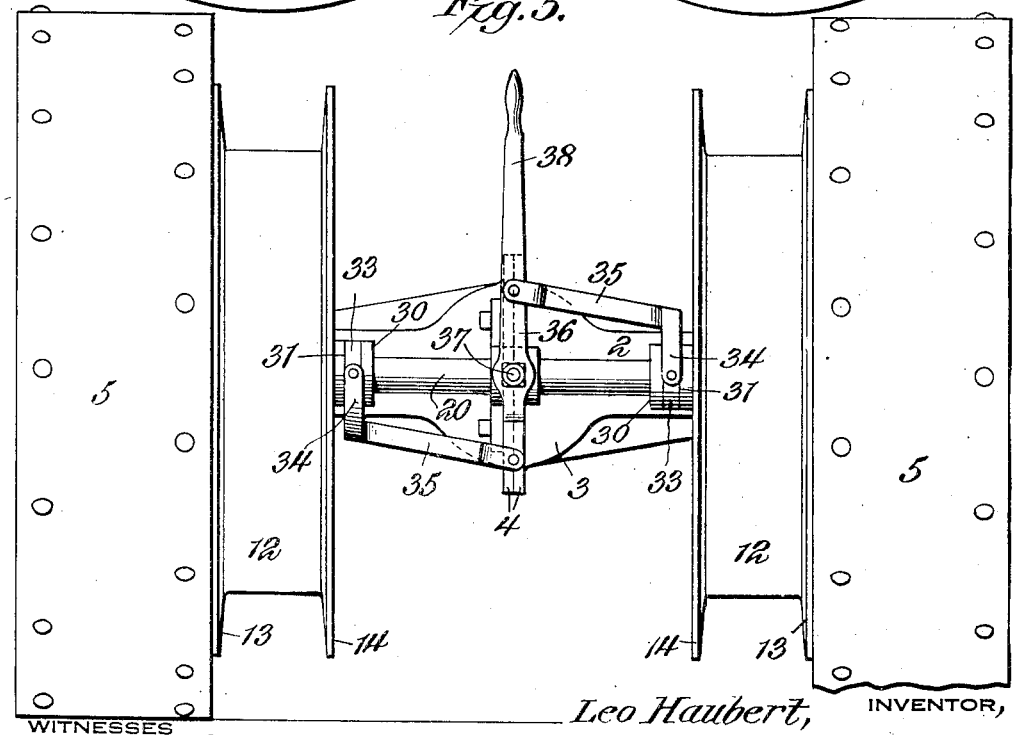
Fig. 5 is a rear elevation of the structure shown in Fig. 1.

The shaft 20 has an intermediate bearing in a bracket 28 fast to the differential casing 3. Mounted on the shaft 20 near the ends thereof are pinions 29 each in position to mesh with a respective one of a series of gear teeth 16 in the drums 12. Each pinion 29 has a hub 30 with a circumferential groove 31 therein, and the shaft 20 where carrying the pinion 29 and its hub 30, carries an elongated spline 32 constraining the pinion and shaft to rotate together but permitting longitudinal movement of the pinion along the shaft. Engaging in each groove 31 is a ring 33 fast to a fork 34 at one end of a respective link 35, the links being pivoted to respectively opposite end portions of a rock lever 36 on opposite sides of a pivot 37 carried by the bracket 28. The lever 36 is provided at one end with a handle 38 in the case of certain forms of tractors, while in other forms the handle 38 is replaced by suitable connections whereby the lever may be manipulated by an operator located in the operator's seat. In Fig. 5, the structure is assumed to be such that the handle 38 is located within reach of an operator in the operator's seat. The purpose of the lever 36 is to actuate the pinions 29 simultaneously in opposite directions, that in one adjustment the pinions mesh with the gear teeth 16 of both drums 12 and in another position the pinions are withdrawn from engagement with the gear teeth.

In order to center each drum 12 to a respective traction wheel 5 and lock the two together, or release the drum and wheel from each other, each drum 12 has a hub 39 projecting axially from the face plate 15 away from the interior of the drum, and mounted on the hub is a taper sleeve 40 with the taper on the exterior face of the sleeve and directed toward the drum. Each taper sleeve is provided with two pairs of screws 41, 42. The screws 41 are tapped through the sleeve 40 so as to press against the hub 39 in a direction to force the sleeve from the hub. The screws 42 are tapped into the hub 39 so that these screws tend to draw the sleeve 39 onto the hub. The outer taper surface of the sleeve 39 engages the inner surface of the hub 7 which is correspondingly tapered, wherefore on screwing up the screws 42, the sleeve 40 is caused to bind tightly in the hub 7, thus holding the wheel 5 frictionally to the drum 12 and centralized therewith. When it is desired to release the wheel 5 from binding relation with the drum 12, the screws 42 are loosened and the screws 41 are tightened, this resulting in forcing the sleeve 40 away from frictional engagement with the hub 7.

It is desirable, when the machine is to be used as a traction engine, that an especially sturdy connection be established between the wheels 5 and the drums 12, the latter being directly driven by the power unit of the tractor and constituting means for driving the traction wheels 5 when the motor vehicle is being used as a tractor. For this purpose, pins 43 extend through the flanges 8 and 9, being mounted in alined holes therein, and perforations or sockets 44 are formed in each head 15 in position to receive the inner ends of these pins, which ends are slightly tapered as indicated at 45 to provide a snug fit. Each pin 43 extends through the flange 9 to the exterior thereof and is provided with a manipulating head 46 in accessible position. Each pin 43 is traversed between the flanges by another pin 47 serving to confine a spring 48 between the pin 47 and the flange 9, the tendency of the spring being to move the pin 43 in a direction to seat the end 45 in a socket or receptacle 44. Where a pin 43 traverses the flange 9, there is provided a slot 49 radial to the passage through which the pin extends, and extending from the slot is a shallow seat 50 to receive a stud 51 radial to the pin 43 and adapted to pass through the slot 49, so that when the lock pin 43 is retracted against the action of the spring 48 sufficiently to withdraw the head 45 from a recess or seat 44 and the pin 43 is turned about its longitudinal axis, the stud 51 catches in the recess 50 and so locks the pin against return to seat in the socket 44. By such means, the wheel 5 and drum 12 may be firmly and strongly locked together, or the wheel 5 may be wholly released from connection with the corresponding drum 12. The pins 43 may be readily made sufficiently sturdy to withstand all strains which may be imposed upon them in causing the drums 12 to drive the traction wheels.

The end of each arm 18 carrying the shaft 20 is laterally extended to form ears 52 to which are pivoted one end of each of two brake shoe supports 53 carrying linings 54 of wood or other suitable material. The end of each brake shoe support remote from the ear 52 is expanded into a head 55 with the two heads 55 of the two brake shoe supports separated by the cam head 26. Connecting the heads 55 is a spring 56 yieldable to the action of the cam head 26 but normally tending to draw the heads 55 toward each other and thus relieve the pressure of the linings 54 upon the inner or brake face 17 of the drum 12.

It is to be understood that a motor vehicle may be provided with any suitable prime mover, whether of the steam or explosion engine type but preferably of the explosion engine type, and it may be further considered that the usual driving and control devices are employed.

If it be assumed that the traction wheels 5 are made fast to the drums 12, with the latter driven by the power unit of the tractor vehicle, the tractor may be driven from place to place, doing such work as a tractor is usually called upon to perform. Under such circumstances, the pinions 29 are withdrawn from engagement with the gear teeth or internal gears 16, so that the differential may function in the ordinary manner.

When it is desired to use the traction machine as a power supplying machine, with the machine as a whole in a fixed position, the pins 43 are withdrawn from locking engagement with the drums 12 and are themselves locked in the flanges 9. Then the screws 41 and 42 are manipulated in the manner already described to force the sleeves 40 out of frictional holding relation with the wheels 5, after which the pinions 29 are moved into mesh with the internal gears 16. Under these circumstances, the prime mover of the vehicle may be started, causing simultaneous rotation of the drums 12 without affecting the wheels 5 which then serve merely as supporting means and do not function as propelling means for the machine. With such an arrangement, the drums 12 receive power from the shaft or axle 1 without any effect upon the traction wheels which then merely serve as supports and, to an extent, as anchorages.

It will be observed that the drums 12 serve as carriers for the traction wheels into which the traction wheels may be tightened and from which they may be loosened and further constituting means from which power may be taken for useful purposes.

It is to be understood that the hub structure will vary in accordance with the particular form of tractor to which the attachment is applied.

This application is a continuation of my application Serial No. 293,524, filed April 29, 1919, for power delivering attachment for automobile tractors, in so far as the two applications contain common subject matter.

What is claimed is:

1. A power delivering attachment for a motor vehicle having a drive axle, comprising substitute traction wheels and a carrier for each wheel separate therefrom and adapted to be applied to and removed from and receive power from the axle, each of said carriers being mounted on and fixed to the axle and provided with means whereby the substitute wheel may be tightened to the carrier and loosened therefrom, and each carrier having means from which power may be taken.

2. A power delivering attachment for a motor vehicle having a drive axle, comprising a substitute tractor wheel to replace a drive wheel of the vehicle, a drum with a hub thereon to receive the substitute tractor wheel, means introducible between the hub and the tractor wheel for carrying the latter, and means for clamping or loosening the substitute tractor wheel from the hub.

3. A power delivering attachment for a motor vehicle having a drive axle, comprising tractor wheels for replacing the drive wheels of the motor vehicle, a hub with a drum thereon for each end of the drive axle, means for clamping the drum and tractor wheels together and for loosening them from each other, and means for positively securing the drums and tractor wheels together.

4. A power delivering attachment for a motor vehicle having a drive axle, comprising tractor wheels for replacing the drive wheels of the motor vehicle, a hub with a drum thereon for each end of the drive axle, means for clamping the drum hub and tractor wheels together and for loosening them from each other, and means for positively securing the drums and tractor wheels together, said drums also having means for connecting them for simultaneous rotation to prevent the differential of the motor vehicle from functioning.

5. A power delivering attachment for the drive axle of a motor vehicle, comprising tractor wheels, one for each side of the vehicle, drums, one for each traction wheel and provided with a hub for carrying the traction wheel, readily removable means for securing the drums and traction wheels together, and a shaft mounted on the rear axle casing of the vehicle and extending from one drum to the other, said shaft being provided with pinions movable into and out of the drums and the drums being provided with internal gear teeth with which the pinions engage when within the drums.

6. A power delivering attachment for the drive axle of a motor vehicle, comprising traction wheels, one for each side of the vehicle, drums, one for each traction wheel and provided with a hub for carrying the traction wheel, readily removable means for securing the drums and traction wheels together, and a shaft mounted on the rear axle casing of the vehicle and extending from one drum to the other, said shaft being provided with pinions movable into and out of the drums and the drums being provided with internal gear teeth with which the pinions engage when within the drums, each drum being also provided with brake means for controlling its rotation.

7. A power delivering attachment for the ends of the drive axle of a motor vehicle, comprising traction wheels, one for each side of the vehicle, drums, one for each traction wheel and provided with a hub for carrying the traction wheel, each drum having an interior brake surface and circular series of gear teeth, brake shoes associated with the brake surface of each drum, means for actuating the brake shoes, a shaft mounted on the rear axle casing of the vehicle and extending from one drum to the other, pinions on the shaft movable into and out of mesh with the gear teeth in the drums, and readily removable means for securing the drums and traction wheels together.

8. A power delivering attachment for the drive axle of a motor vehicle, comprising traction wheels for the opposite ends of the drive axle, a hollow drum for each end of the drive axle and having a hub connected to the latter to be driven thereby, a wedging sleeve between the hub of the drum and the traction wheel, and oppositely acting screws in the sleeve for forcing the latter into and out of wedging position.

9. A power delivering attachment for the drive axle of a motor vehicle, comprising traction wheels for the opposite ends of the drive axle, a hollow drum for each end of the drive axle and having a hub connected to the latter to be driven thereby, a wedging sleeve between the hub of the drum and the drive axle, and oppositely acting screws in the sleeve for forcing the latter into and out of wedging position, certain of the screws being threaded in the sleeve to bear against the hub of the drum and certain of the screws being threaded in the hub of the drum and engaging the sleeve.

10. A power delivering attachment for the drive axle of a motor vehicle, comprising traction wheels, one for each side of the vehicle and each with an inwardly tapering hub, drums, one for each traction wheel, and provided with a hub on which the traction wheel is carried, a wedging sleeve between the drum hub and the traction wheel hub, and means for forcing the sleeve into and out of wedging relation to the drum hub and traction hub.

11. A power delivering attachment for the drive axle of a motor vehicle, comprising a drum at each end of the drive axle, with each drum provided with a hub and connected to the drive axle to be driven thereby, readily releasable means for connecting each traction wheel and adjacent drum together at each end of the axle, gear connections between the drums for causing the simultaneous movement of the latter, and means common to the gearing connections for disconnecting the drums to rotate individually.

12. A power delivering attachment for the drive axle of a motor vehicle, comprising a drum adapted to be applied to each end of the drive axle for rotation by the latter, a traction wheel carried by each drum, and means for connecting the traction wheel to the drum for positive rotation by the latter, comprising a series of pins carried by the traction wheel and movable into and out of engagement with the drum.

13. A power delivering attachment for the drive axle of a motor vehicle, comprising a drum adapted to be applied to each end of the drive axle for rotation by the latter, a traction wheel carried by each drum, means for connecting the traction wheel to the drum for positive rotation by the latter, comprising a series of pins carried by the traction wheel and movable into and out of engagement with the drum, said pins having a normal tendency to engage the drum and having means permitting the retracting of the pins against their normal tendency, and means for locking the pins in the retracted position.

14. A power delivering attachment for the drive axle of a motor vehicle, comprising a drum adapted to be applied to each end of the drive axle for rotation by the latter, a traction wheel carried by each drum, means for connecting the traction wheel to the drum for positive rotation by the latter, comprising a series of pins carried by the traction wheel and movable into and out of engagement with the drum, said pins having a normal tendency to engage the drum and having means permitting the retracting of the pins against their normal tendency, means for locking the pins in the retracted position, and means for centering and clamping the traction wheel to the drum and for releasing the traction wheel from clamping relation to the drum.

15. A power delivering attachment for the drive axle of a motor vehicle, comprising a circular series of pins each mounted in a traction wheel and having a spring with a normal tendency to force the pin into holding engagement with the drum, each pin also having a manipulating head at the outer end and a lock means for holding the pin in retracted position out of engagement with the drum.

16. A power delivering attachment for the drive axle of a motor vehicle, comprising traction wheels at opposite ends of the axle, drums at opposite ends of the axle and carrying the traction wheels, each drum being provided with an internal gear at the end toward the other drum, a shaft extending between and into the drums, pinions slidable on and rotatable with the shaft for engaging the gears, and manipulating means for the pinions common to both to move the pinions simultaneously out of mesh with the gears and into mesh therewith.

17. A power delivering attachment for the drive axle of a motor vehicle, comprising traction wheels, one for each side of the vehicle, drums, one for each side of the vehicle and constituting a carrier for a respective traction wheel, means for connecting each traction wheel to and disconnecting it from its drum, and means for connecting the drums together for simultaneous movement and disconnecting them for individual movement.

18. A power delivering attachment for the drive axle of a motor vehicle, comprising supporting wheels, one at each end of the axle, drums, one at each end of the axle, carried by the respective traction wheels, means for connecting the respective drums and traction wheels together and disconnecting them from each other, each drum being provided with an internal gear wheel and with an internal brake surface, brake shoes for engaging the brake surfaces of the drums, a shaft common to the drums, pinions slidable on and rotatable with the shaft and movable into and out of mesh with the internal gears, and manipulating means for causing the movement of the pinions into and out of engagement with the gears.

19. In a power delivering attachment for motor vehicles, a drive axle, a substitute drive wheel for the opposite ends of the drive axle of the vehicle, a drum for each substitute traction wheel provided with a hub for carrying the traction wheel, a brake surface within each drum, a brake shoe also within each drum and associated with each brake surface, means for actuating the brake shoes, readily removable means for securing the drums and substitute traction wheels together, and means for connecting the drums to the driving means of the motor vehicle.

20. A power delivering attachment for the drive axle of a motor vehicle, comprising supporting wheels, one at each end of the axle, drums, one at each end of the axle, carried by the respective traction wheels, means for connecting the respective drums and traction wheels together and disconnecting them from each other, each drum being provided with gear teeth and a brake surface, brake shoes for engaging the brake surfaces of the drums, a shaft common to the drums, pinions slidable on and rotatable with the shaft and movable into and out of mesh with the gear teeth, manipulating means for causing the movement of the pinions into and out of engagement with the gear teeth, and means for actuating the brake shoes with respect to the brake surfaces.

In testimony that I claim the foregoing as my own, I have hereto affixed my signature.

LEO HAUBERT.